United States Patent
Ingram et al.

(10) Patent No.: US 6,874,312 B2
(45) Date of Patent: Apr. 5, 2005

(54) OXIDANT STORAGE CAPACITY ESTIMATION

(75) Inventors: Grant Alan Ingram, West Lafayette, IN (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 10/281,927

(22) Filed: Oct. 28, 2002

(65) Prior Publication Data

US 2003/0070422 A1 Apr. 17, 2003

Related U.S. Application Data

(63) Continuation of application No. 09/884,765, filed on Jun. 19, 2001, now Pat. No. 6,594,986.

(51) Int. Cl.[7] ................................................ F01N 3/00
(52) U.S. Cl. .............................. 60/277; 60/274; 60/276; 60/285; 123/103
(58) Field of Search .......................... 60/274, 276, 277, 60/285, 295, 297, 301; 701/103, 109

(56) References Cited

U.S. PATENT DOCUMENTS

| | | | | |
|---|---|---|---|---|
| 5,351,484 A | * | 10/1994 | Wade ........................... | 60/274 |
| 6,220,018 B1 | * | 4/2001 | Yamanashi et al. ........... | 60/285 |
| 6,374,596 B2 | * | 4/2002 | Taga et al. .................... | 60/277 |
| 6,383,267 B1 | * | 5/2002 | Takaku et al. ................. | 96/111 |
| 6,481,201 B2 | * | 11/2002 | Kako et al. .................... | 60/285 |
| 6,571,551 B2 | * | 6/2003 | Lundgren et al. ............. | 60/298 |
| 6,622,479 B2 | * | 9/2003 | Kakuyama et al. ........... | 60/285 |

* cited by examiner

*Primary Examiner*—Binh Q. Tran
(74) *Attorney, Agent, or Firm*—Julia Voutyras

(57) ABSTRACT

A method for determining the efficiency of a three-way catalyst is presented. It is shown that more accurate results are achieved if the efficiency estimates are performed when the engine is at idle or during low load operating conditions. The efficiency is inferred from the amount of fuel required to purge the device after it has been fully saturated with oxidants due to lean operation. Due to improved accuracy and reduced reductant waste, this method allows for improved emission control and fuel efficiency.

4 Claims, 3 Drawing Sheets

OXIDANT STORAGE CAPACITY ESTIMATION

This application is a continuation application of U.S. Ser. No. 09/884,765, filed Jun. 19, 2001, now U.S. Pat. No. 6,594,986 having the same assignee as this continuation application, and which is incorporated herein by reference in its entirety.

FIELD OF THE INVENTION

The present invention relates to a system and a method for estimating storage capacity of an exhaust gas aftertreatment device, and more particularly, to estimating an oxidant storage capacity of a Lean NOx Trap coupled downstream of an internal combustion engine.

BACKGROUND OF THE INVENTION

Internal combustion engines are typically coupled to an emission control device known as a three-way catalytic converter (TWC) designed to reduce combustion by-products such as carbon monoxide (CO), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap (LNT), is usually coupled downstream of an upstream three-way catalyst. The LNT stores exhaust components such as, for example, NOx and oxygen, when the engine is operating at a lean air-fuel ratio, and releases and reduces (purges) them when the engine is operating at a rich or stoichiometric air-fuel ratio. Over time, the ability of the LNT to store exhaust components can decrease due to factors such as sulfur deposits (SOx) from the fuel. Therefore, when the LNT efficiency is sufficiently reduced, a SOx purge has to be performed. Typically, the catalyst is heated and engine air-fuel ratio is changed to rich for SOx release and reduction. Since SOx purges result in fuel economy penalties, it is desirable not to purge unnecessarily. Thus, in order to maintain adherence to emission standards and obtain fuel economy benefits of a lean burning engine, it is desirable to monitor the efficiency of the LNT.

One method of determining the efficiency of the LNT is by correlating it to the oxidant storage capability, as described in U.S. Pat. No. 5,713,199. The amount of stored oxidant is calculated from a quantity of fuel required to purge it from the LNT wherein the purge is performed during high load operating conditions.

The inventors herein have recognized a disadvantage with this approach. Namely, when estimates of this method are performed under high load operating conditions, i.e., at high space velocity, the amount of time that the reductant used to purge stored oxidants is present in the LNT is reduced. Therefore, not all of the oxidants are purged during high-speed engine operation, resulting in an inaccurate estimate of the total LNT storage capacity. In other words, the reductant does not have sufficient time to react with stored oxidants when the LNT purge is performed under high load conditions. This will cause inaccurate capacity estimates and reductant wastage.

SUMMARY OF THE INVENTION

In solving the above problem, a system and a method are provided for monitoring efficiency of an exhaust gas aftertreatment device by correlating it to the device's capacity to store an exhaust component.

In carrying out the above solution, features and advantages of the present invention, a system and a method for monitoring an efficiency of an exhaust gas aftertreatment device disposed in an exhaust passage of a lean burn internal combustion engine, include providing an indication that the engine is operating at low space velocity; and in response to said indication, estimating an amount of an exhaust component stored in the device.

The present invention provides a number of advantages. For example, it allows for much more accurate estimate of oxidant storage capacity, since at idle or low load operation the reductant injected into the device has more time to react with the stored oxidants than during high speed operation. Therefore, all of the oxidants stored will be released, and wastage of reductant will be eliminated. Thus, due to increased accuracy of oxidant storage estimation, the efficiency of the LNT can be determined with more precision and less reductant wastage. This in turn will prevent unnecessary purges allowing for more lean running time, and increase fuel economy. Also, improved emission control can be achieved due to improved accuracy.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such a s conventional engines in addition to direct injection stratified charge (DISC) or direct injection spark ignition engines (DISI).

Figure 1:
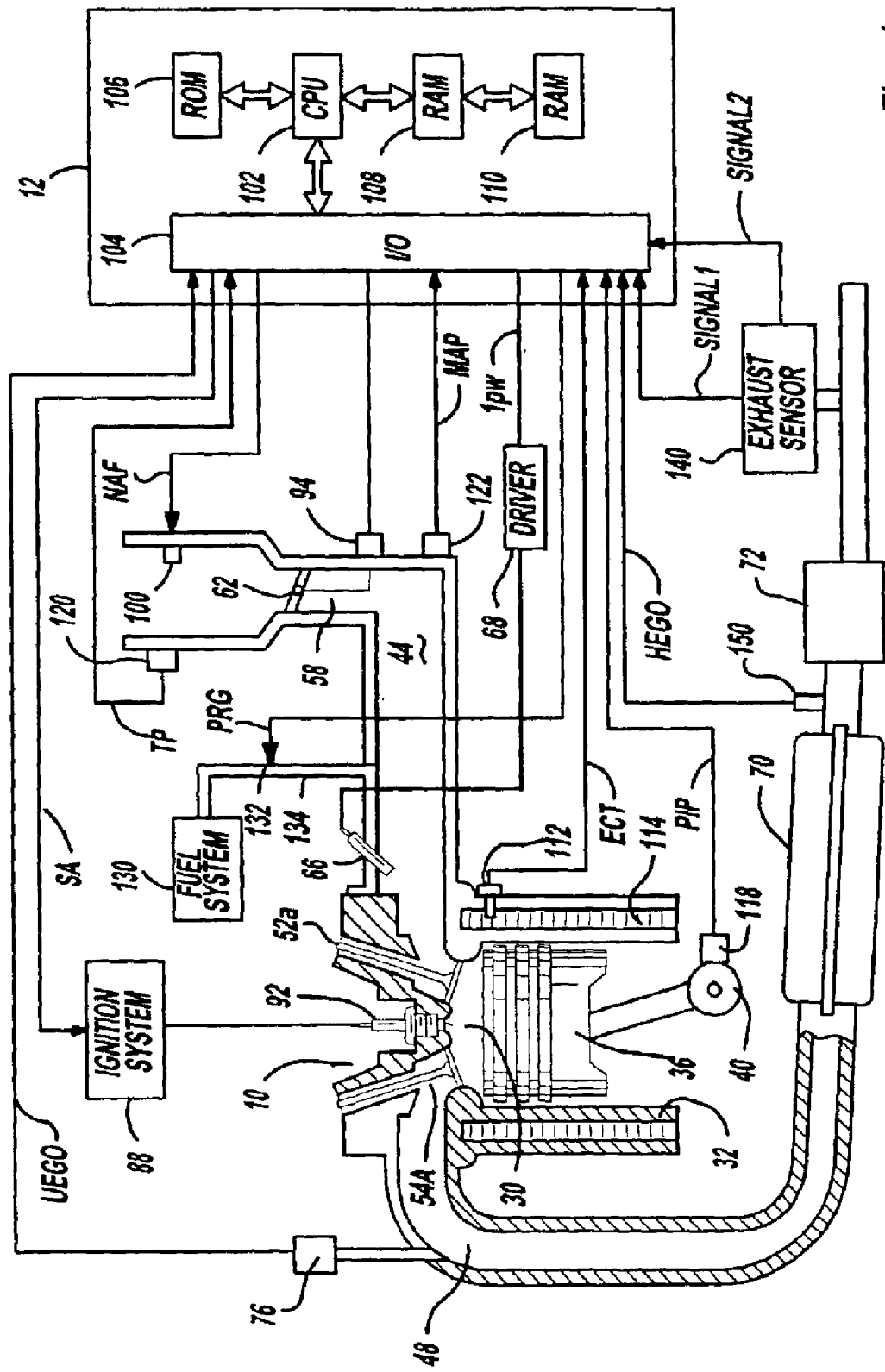
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In this particular example, the piston 30 includes a recess or bowl (not shown) for forming stratified charges of air and fuel. In addition, the combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio.

Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases.

Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures.

In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx trap 72 is shown positioned downstream of catalytic converter 70. Both devices store exhaust gas components, such as NOx and oxidants, when engine 10 is operating lean of stoichiometry. The stored NOx and oxidants are subsequently reacted with HC and other reductant and are catalyzed during a purge cycle when controller 12 causes engine 10 to operate in either a rich mode or a near stoichiometric mode.

Exhaust gas oxygen sensor 150 is shown coupled to exhaust manifold 48 between the catalytic converter 70 and the NOx trap 72. In this particular example, sensor 150 provides signal HEGO to controller 12, and essentially serves as a switch providing information as to whether the air-fuel mixture is lean or rich at the mid-bed location.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2:
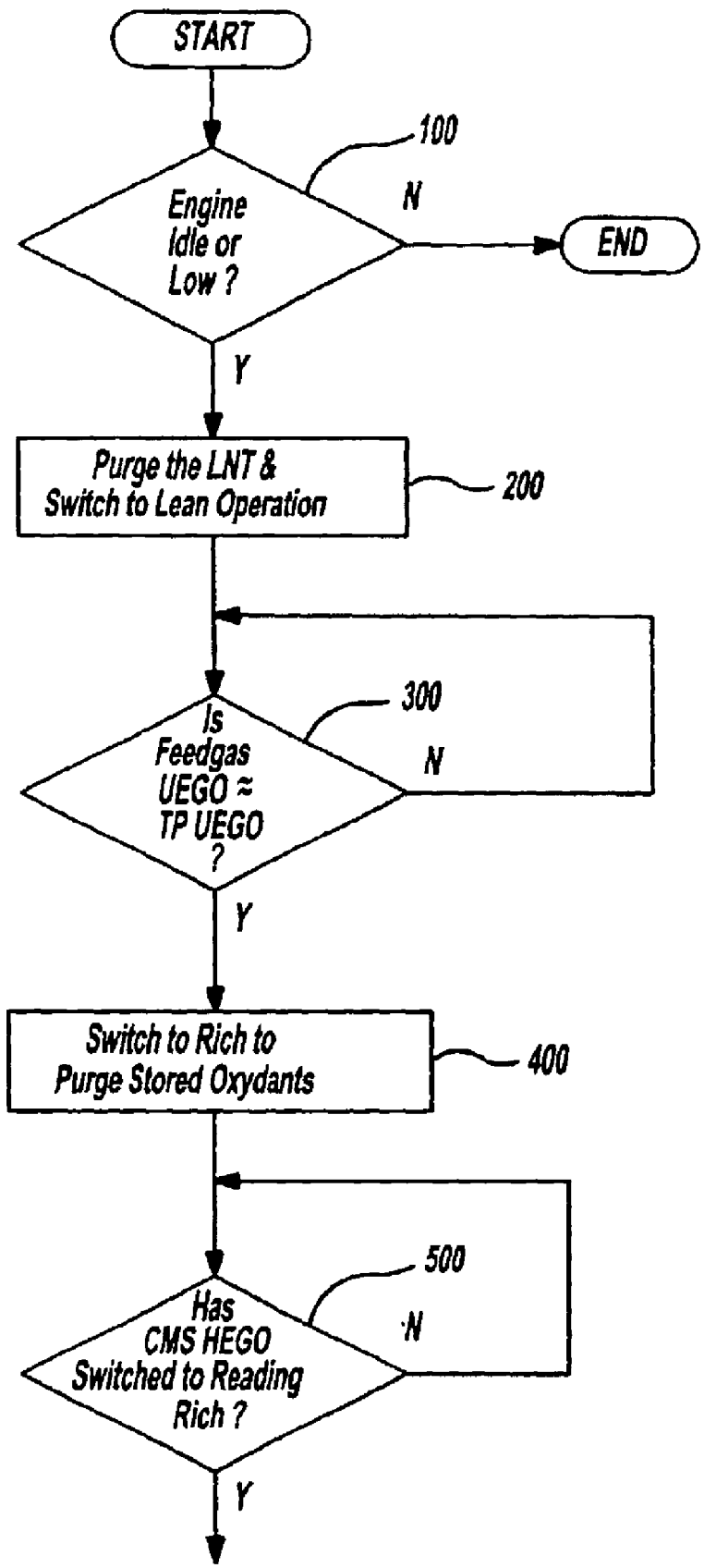
FIG. 2 is a block diagram of the embodiment in which the invention is used to advantage.
Figure 3:
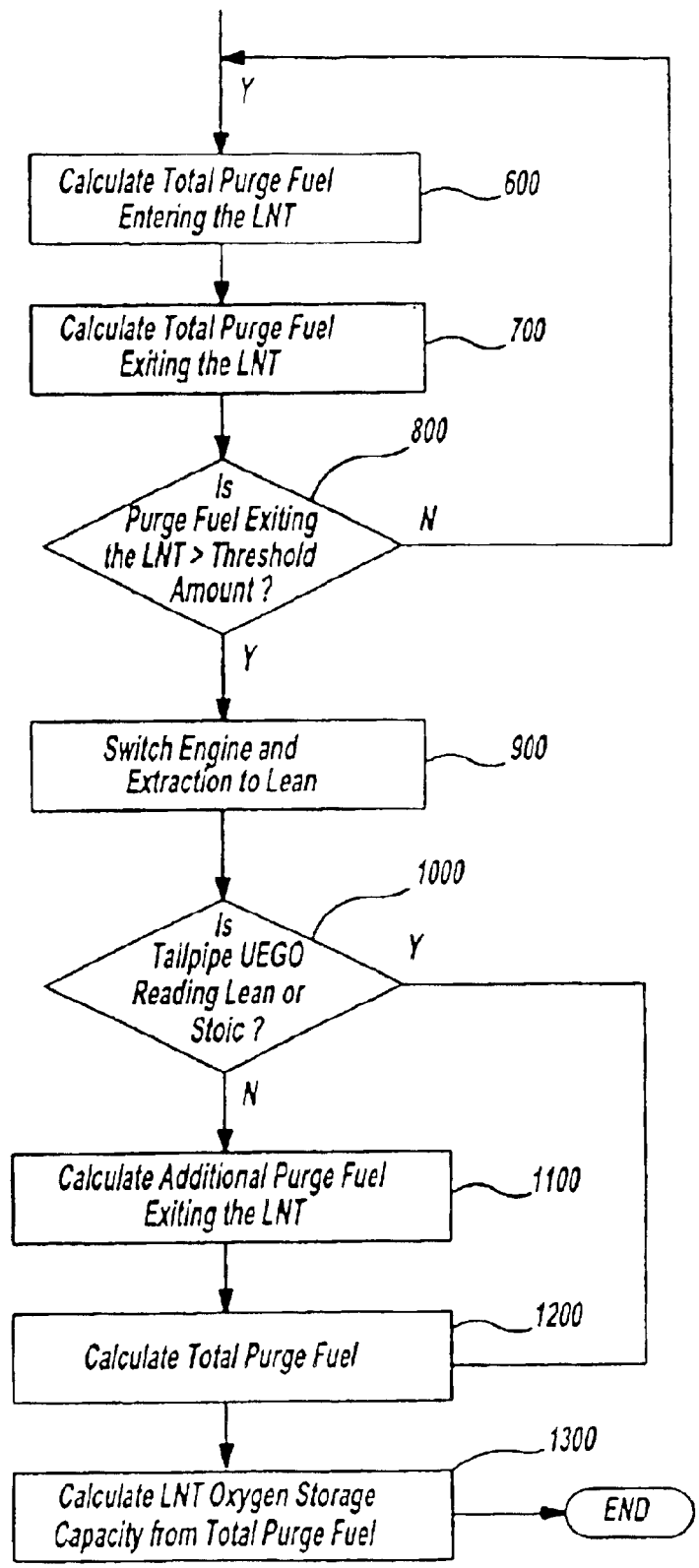

The diagram in FIG. 2 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description.

Although not explicitly illustrated, one of ordinary skill in the art will recognize that one or more of the illustrated steps or functions may be repeatedly performed depending on the particular strategy being used.

Referring now to FIG. 2, first, in a decision block 100 a determination is made whether the engine is operating at idle or low load conditions. If the answer is NO, the routing cycles through step 100, until the engine is at idle or low load conditions. Once the answer to decision block 100 is YES, the routine proceeds to step 200 wherein engine operation is switched to rich in order to purge stored exhaust gas components from the LNT. The purge is followed by lean operation in order to saturate the exhaust system with oxidants. Preferably, the engine is operated at its lean-limit so as to saturate the exhaust system as fast as possible. Next, in step 300 the output signal of the tailpipe UEGO sensor is compared to the output signal of the UEGO sensor upstream of the TWC. Once the two signals are within a predetermined constant of each other, i.e., close in value, meaning that the LNT is saturated with oxidants, then the answer to step 300 is YES and the routine proceeds to step 400. Otherwise, the routine continues cycling through step 300.

Next, in step 400, the engine operation is switched to rich in order to purge the stored oxidants. The routine then proceeds to step 500 wherein a determination is made whether the HEGO sensor 150 has switched to reading rich, i.e., none of the purge fuel is being used to purge oxidants from the TWC. Once the answer to step 500 is YES, the routine proceeds to step 600 wherein the total amount of purge fuel, FG_FUEL_SUM, is calculated according to the following equation:

$$\text{FG\_FUEL\_SUM} = \frac{453.4 \text{ gm/lb}}{60 \text{ sec/min} \cdot 14.6} \int_{\text{start\_of\_purge}}^{\text{end\_of\_purge}} \text{Air\_Mass\_Flow} \cdot \left(\frac{1 - \text{FG\_Lambda}}{\text{FG\_Lambda}}\right) dt$$

where Air_Mass_Flow is measured in lbs/min and FG_LAMBDA is either the actual air-fuel ratio obtained from the feedgas UEGO sensor located upstream of the TWC or, instead, an open loop requested air-fuel ratio value.

Alternatively, the injector pulse-width information which provides a measure of the fuel injected in the cylinder in conjunction with the air mass flow rate information from the air meter can be used to calculate the amount of purge fuel entering the LNT. Proceeding now to step 700, TP_FUEL_SUM1, the amount of purge fuel exiting the LNT is calculated according to the following equation:

$$\text{TP\_FUEL\_SUM1} = \frac{453.4 \text{ gm/lb}}{60 \text{ sec/min} \cdot 14.6} \int_{\text{start\_of\_purge}}^{\text{end\_of\_purge}} \text{Air\_Mass\_Flow} \cdot \left(\frac{1 - \text{TP\_Lambda}}{\text{TP\_Lambda}}\right) dt$$

wherein TP_Lambda is the tailpipe air-fuel ratio of the exhaust gas exiting the LNT obtained from the NOx/UEGO sensor 140.

The routine then proceeds to step 800 wherein a determination is made whether the amount of purge fuel exiting the LNT, TP_FUEL_SUM1, has exceeded a predetermined threshold amount, TPOXPGFUEL_MX. If the answer to step 800 is NO, indicating that purge fuel is still being used to reduce stored oxidants, and that the LNT is not fully purged yet, the routine returns to step 600 wherein the amounts of purge fuel entering and exiting the LNT are updated. If the answer to step 800 is YES, i.e., the oxidant purge is completed, the routine proceeds to step 900 wherein rich operation is terminated and stoic/lean air-fuel ratio is requested.

Next, the routine proceeds to step 1000 wherein a determination is made whether the SIGNAL1 (UEGO) output of the sensor 140 is reading lean or stoic. If the answer to step 1000 is NO, meaning purge fuel is still exiting the LNT, the additional purge fuel amount, TP_FUEL_SUM2, is calculated in step 1100 according to the following equation:

$$\text{TP\_FUEL\_SUM2} = \frac{453.4 \text{ gm/lb}}{60 \text{ sec/min} \cdot 14.6} \int_{\text{end\_of\_purge}}^{(\text{end\_of\_purge})+t} \text{Air\_Mass\_Flow} \cdot \left(\frac{1 - \text{TP\_Lambda}}{\text{TP\_Lambda}}\right) dt$$

wherein t is the time it takes for the UEGO sensor to start reading stoic or lean after the end of the LNT NOx purge. The routine then proceeds to step 1200 wherein the net fuel used to purge the LNT of stored oxidants, OX_PG_FUEL, is calculated according to the following equation:

OX_PG_FUEL=FG_FUEL_SUM−(TP_FUEL_SUM 1+TP_FUEL_SUM2)

In other words, the total fuel required to purge the LNT of stored oxidants is the difference between the purge fuel entering the trap and the purge fuel exiting the trap.

If the answer to step 1000 is YES, i.e., no additional purge fuel is exiting the LNT, the routine proceeds directly to step 1200. Next, in step 1300, the amount of oxidants stored in the LNT is calculated as follows:

LNT_OX_CAP=OX_PG_FUEL·FUEL_TO_OX_FACTOR wherein the conversion factor FUEL_TO_OX_FACTOR, is the amount of oxidant per gram of purge fuel. The routine then exits.

Therefore, according to the present invention, a more precise measure of the LNT efficiency can be obtained by calculating the amount of fuel required to perform a purge after the trap has been saturated with oxidants while the space velocity is low, i.e., during low speed or idle engine operation. The measure of oxidant storage can then be used to schedule sulfur purge events when necessary.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for monitoring an efficiency of an exhaust gas aftertreatment device disposed in an exhaust passage of a lean burn internal combustion engine, the method comprising:

indicating that the engine is operating at low space velocity; and in response to said indication, operating the engine at an air-fuel ratio lean of stoichiometry thereby causing oxidants to be stored in the device, indicating that the device is substantially saturated with said stored oxidants, in response to said indication, switching engine operation to an air-fuel ratio rich of stoichiometry thereby purging said stored oxidants, and calculating an amount of fuel required to complete said purge.

2. The method as set forth in claim 1 wherein the exhaust gas aftertreatment device is a three way catalyst.

3. The method as set forth in claim 2 wherein said three way catalyst is a Lean NOx Trap (LNT).

4. The method as set forth in claim 3, further comprising performing a sulfur purge of the device if said amount of stored oxidant is below a predetermined value.

\* \* \* \* \*